United States Patent
Van Dine et al.

(10) Patent No.: US 6,452,301 B1
(45) Date of Patent: Sep. 17, 2002

(54) MAGNET RETENTION ARRANGEMENT FOR HIGH SPEED ROTORS

(75) Inventors: Pieter Van Dine, Mystic, CT (US); Alberto Franco, Hazlet; Spyro Pappas, Fort Lee, both of NJ (US); Michael Gheorghiu, Forest Hills, NY (US)

(73) Assignee: Electric Boat Corporation, Groton, CT (US)

( * ) Notice: Subject to any disclaimer, the term of this patent is extended or adjusted under 35 U.S.C. 154(b) by 0 days.

(21) Appl. No.: 10/002,785

(22) Filed: Nov. 2, 2001

(51) Int. Cl.[7] ............................................... H02K 21/22
(52) U.S. Cl. ................................................ 310/156.12
(58) Field of Search ...................... 310/156.01–156.84, 310/271

(56) References Cited

U.S. PATENT DOCUMENTS

| | | | |
|---|---|---|---|
| 3,169,203 A | 2/1965 | Lavin | 310/156.51 |
| 4,219,752 A | 8/1980 | Katou | 310/156 |
| 4,633,113 A | 12/1986 | Patel | 310/156 |
| 4,674,178 A | 6/1987 | Patel | 29/598 |
| 4,729,160 A | 3/1988 | Brown | 29/598 |
| 4,879,485 A | 11/1989 | Tassinario | 310/156 |
| 4,910,861 A | 3/1990 | Dohogne | 29/598 |
| 4,930,201 A | 6/1990 | Brown | 29/258 |
| 4,973,872 A | 11/1990 | Dohogne | 310/156 |
| 5,200,662 A | 4/1993 | Tagami et al. | 310/261 |
| 5,485,045 A | 1/1996 | Canders et al. | 310/156 |
| 5,488,260 A | 1/1996 | Heyraud | 310/156 |
| 5,744,887 A | 4/1998 | Itoh | 310/156 |
| 5,952,755 A * | 9/1999 | Lubas | 310/156.19 |
| 6,047,461 A | 4/2000 | Miura et al. | 29/598 |
| 6,085,527 A | 7/2000 | Woollenweber et al. | 60/607 |
| 6,104,115 A | 8/2000 | Offringa et al. | 310/156 |
| 6,144,130 A | 11/2000 | Kawamura | 310/156 |
| 6,145,314 A | 11/2000 | Woollenweber et al. | 60/607 |

OTHER PUBLICATIONS

Pending U.S. Patent Application Serial No. 09/883,053, John Weighlofer et al., Magnet Retention Channel Arrangement for High Speed Operation, filed Oct. 31, 2001.

Pending U.S. Patent Application Serial No. 10/002,786, Pieter Van Dine et al., Permanent Magnet Retaining Arrangement for High Speed Rotors, filed Nov. 2, 2001.

* cited by examiner

*Primary Examiner*—Nestor Ramirez
*Assistant Examiner*—Hanh Nguyen
(74) *Attorney, Agent, or Firm*—Baker Botts, LLP

(57) ABSTRACT

In the rotor arrangement disclosed in the specification a rotor has a central shaft with a surrounding rim to which a circumferential array of pole pieces is mechanically affixed by screws. An array of permanent magnets each mounted between an adjacent pair of pole pieces is radially retained in position by a slot wedge having edges shaped to interlock with the outer side portions of the adjacent pole pieces. The outer surfaces of the pole pieces and slot wedges form a uniform cylindrical outer surface which is covered by an outer wrap of fiber reinforced polymer material to assure that the magnets are retained radially in position.

6 Claims, 2 Drawing Sheets

MAGNET RETENTION ARRANGEMENT FOR HIGH SPEED ROTORS

BACKGROUND OF THE INVENTION

This invention relates to arrangements for retaining magnets radially in position in permanent magnet rotors for electric machines which operate at high speed.

Conventional permanent magnet rotors have a circumferential spaced array of pole pieces which are made of magnetic material and are shaped to achieve optimum magnetic performance along with permanent magnets which are retained in the spaces between the pole pieces by slot wedges having flat outer surfaces that span the distance between the poles. The slot wedges are made of nonmagnetic material to avoid shunting magnetic flux and have edges which are received in recesses in the pole pieces to restrain them and the magnets beneath them from radial displacement during rotation of the rotor. When the rotor is rotated at high speed, however, the slot wedges may not have sufficient rigidity to maintain the magnets in fixed positions in the radial direction.

The Lavin et al. U.S. Pat. No. 3,169,203 discloses a square wave pulse generator having a permanent magnet rotor in which T-shaped permanent magnets are mounted on a central hexagonal core and retained in position radially by soft iron shoes formed from laminations which are held against the outer surface of the magnets by lateral projections which are embedded in epoxy resin members disposed between the magnets. Stainless steel plates at opposite ends of the rotor are joined by rivets which extend through the epoxy resin members.

The Patel U.S. Pat. Nos. 4,633,113 and 4,674,178 disclose a permanent magnet rotor having a hexagonal hub and permanent magnets which are adhesively bonded to the hub surfaces, the spaces between the magnets being filled by epoxy material which is then ground off so that the magnets and intervening filler material have a common cylindrical surface. An outer layer is provided by winding a fiber such as carbon fiber in a curable resin such as an epoxy resin circumferentially about the cylindrical surface after which the resulting layer is cured and ground to provide a smooth cylindrical surface.

The Brown U.S. Pat. Nos. 4,729,160 and 4,930,201 disclose a permanent magnet rotor having an array of permanent magnets adhesively bonded to a hub and a sleeve surrounding the magnets and the intervening filler pieces which is made of a composite material consisting of high strength, high modulus fibers such as fiberglass, graphite, boron or the like in an epoxy or other plastic matrix.

SUMMARY OF THE INVENTION

Accordingly, it is an object of the present invention to provide a magnet retention arrangement for permanent magnet rotors operating at high speed which overcomes disadvantages of the prior art.

Another object of the invention is to provide a permanent magnet retention arrangement for high speed rotors which has a smooth cylindrical peripheral surface to reduce windage losses while securely retaining the magnets in position.

These and other objects of the invention are attained by providing a permanent magnet rotor having a rim member on which an array of angularly spaced pole pieces are retained by mechanical connections such as screws, and an array of magnets disposed between the pole pieces are held in position radially by peripheral wedges which have an interlocking connection, such as a tongue and groove connection, with the adjacent pole pieces and the wedges and pole pieces forming a smooth outer common cylindrical surface, along with a fiber wrap surrounding the rotor assembly.

In a preferred embodiment the pole pieces may be assembled from laminated magnetic material or be constituted by electrically isolated pressed powder to form a solid member and permanent magnets inserted in the spaces between the pole pieces are radially retained by slot wedges which are flat bars having edges with slots shaped to receive projections from the adjacent portions of the pole pieces. The pole pieces and the slot wedges are machined to provide a smooth cylindrical common outer surface which is covered by a composite wrap of fiber-reinforced polymer material to maintain the radial rigidity of rotor structure in response to centrifugal forces acting on the magnets during high speed operation. With this arrangement, the irregular peripheral shape of conventional permanent magnet rotors is replaced by a smooth cylindrical surface to reduce windage losses and the secure retention of the magnets by the composite outer wrap permits higher rotational speed of the rotor.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
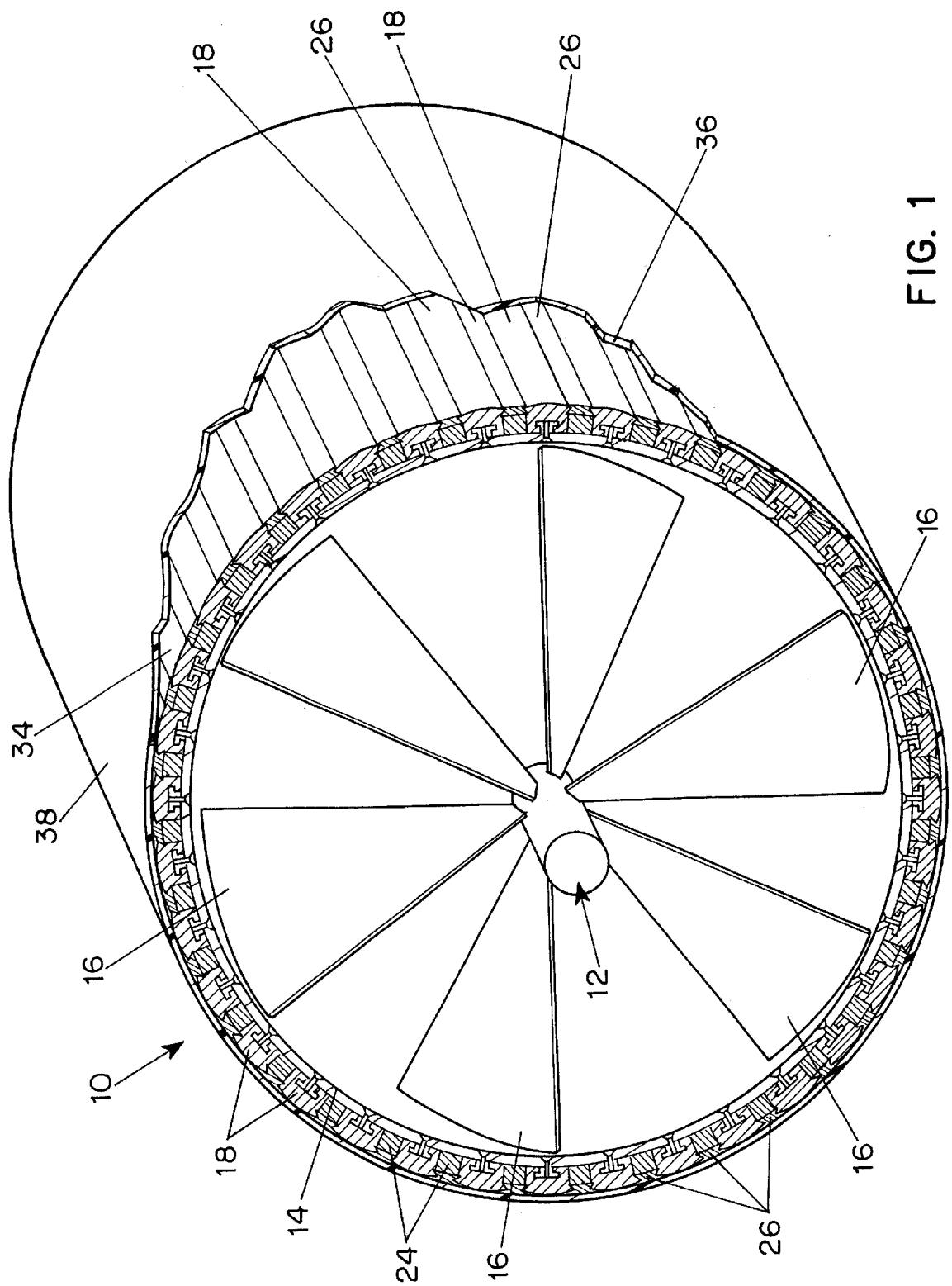
FIG. 1 is a schematic perspective view, partly in section, illustrating a representative embodiment of a magnet retention arrangement for a high speed rotor in accordance with the invention.
Figure 2:
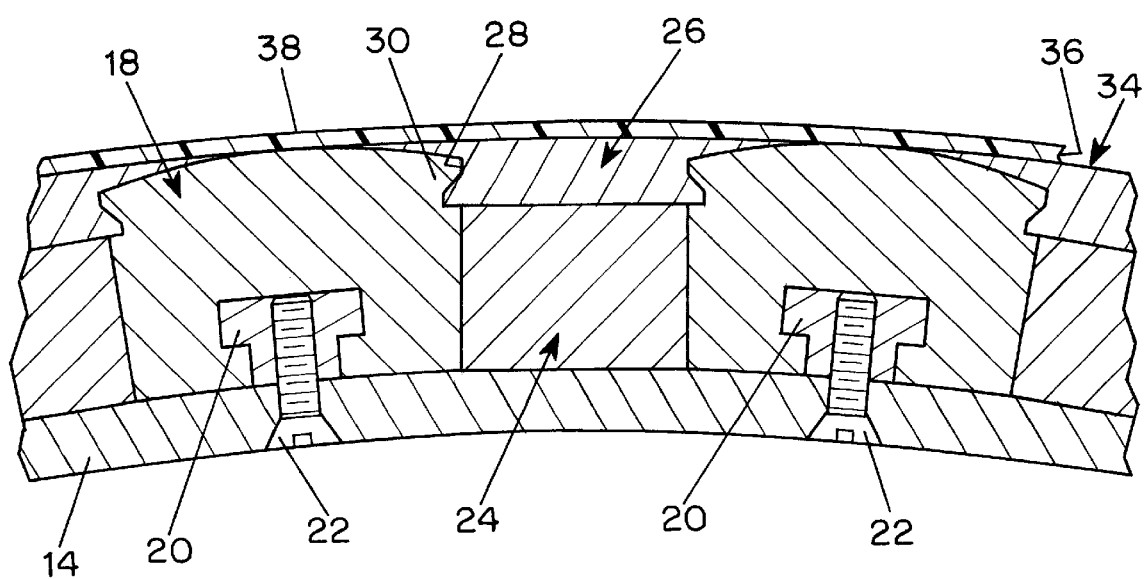
FIG. 2 is a fragmentary sectional view illustrating the structure of the magnet retention arrangement shown in FIG. 1.

In the typical embodiment of the invention illustrated in the drawings, a rotor 10 has a support shaft 12 connected to an outer rim 14 by an array of radially extending angularly spaced inclined blades 16 forming a rim driven propeller which may, for example, be used in a propulsion pod. A spaced circumferential array of pole pieces 18 is attached to the rim 14 by key members 20 and screws 22. The pole pieces 18, which extend longitudinally in the direction parallel to the axis of the rotor, are spaced by intervening permanent magnets 24 which also extend longitudinally parallel to the axis of the rotor and are oriented to direct magnetic flux toward the adjacent pole pieces 18 on opposite sides so as to produce a flux path extending generally radially outwardly from the pole pieces. The pole pieces 18 may be made of laminated magnetic material in the usual manner or may be electrically isolated pressed powder pieces. Each magnet 24 is retained by a slot wedge 26 and having longitudinal grooves 28 extending along each edge and made of nonmagnetic material to avoid shorting. As best seen in FIG. 2 the grooves 28 receive corresponding projections 30 from the lateral surfaces of the adjacent pole pieces 18 at locations radially outwardly from the magnet 24 adjacent to the slot wedge 26.

In order to reduce windage at high speed rotation of the rotor 10 the outer surfaces of the pole pieces 18 and slot wedges 26 are machined to produce a smooth cylindrical surface 34 as shown in FIG. 2. In addition, to assure the radial retention of the magnets 24 and slot wedges 26, the entire cylindrical surface 34 is enclosed in an outer wrap 36 formed from a fiber-reinforced organic or inorganic polymer composite material with wound fibers selected from glass, aramid, carbon polyester or quartz materials wrapped around the surface 34 of the rotor. Preferably, the composite is created using a dry layup resin transfer molding and a wet or preimpregnated filament technique. Thus, the outer composite wrap constitutes a containment wall which opposes the centrifugal forces generated by the magnets and wedges during high speed rotation and provides a smooth cylindrical outer surface 38 to help reduce windage losses.

Although the invention has been described herein with reference to a specific embodiment, many modifications and variations therein will readily occur to those skilled in the art. Accordingly, all such variations and modifications are included within the intended scope of the invention.

We claim:

1. A permanent magnet rotor arrangement comprising:

a rotor having a hub and a rim mechanically connected to the hub;

an array of pole pieces made of magnetic material circumferentially distributed around the rim; and an array of permanent magnets circumferentially distributed around the rim and interspersed between the pole pieces, each magnet being radially retained by a non-magnetic wedge having interlocking engagement with adjacent pole pieces on opposite sides of the magnet, the radially outer surfaces of the pole pieces and the wedges forming a smooth cylindrical surface of substantially uniform diameter; and a fiber wrap layer surrounding the cylindrical surface to facilitate radial retention of the magnets and having a smooth outer surface to reduce windage losses at high rotational speeds.

2. A rotor arrangement according to claim 1 wherein the fiber wrap contains fibers selected from the group consisting of glass, aramid, carbon, polyester and quartz fibers.

3. A rotor arrangement according to claim 2 wherein the fibers in the outer wrap are applied by a technique selected from a dry layup resin transfer molding and wet or preimpregnated filament winding techniques.

4. A rotor arrangement according to claim 1 wherein the pole pieces consist of laminated magnetic material.

5. A rotor arrangement according to claim 1 wherein the pole pieces are made of electrically isolated pressed powder solid material.

6. A rotor arrangement according to claim 1 wherein the pole pieces are retained on the rotor rim by screws.

\* \* \* \* \*